United States Patent
File

[15] 3,674,140
[45] July 4, 1972

[54] ARTICLE SENSING APPARATUS

[72] Inventor: Harold Thomas File, Gerrards Cross, England

[73] Assignee: Aspro-Nicholas Limited, Slough, England

[22] Filed: Dec. 21, 1970

[21] Appl. No.: 100,324

[30] Foreign Application Priority Data

Jan. 2, 1970  Great Britain............................163/70

[52] U.S. Cl....................................209/73, 209/74, 137/82, 73/37.6, 53/53
[51] Int. Cl............................................................B07c 5/34
[58] Field of Search..................73/37, 37.5, 37.6, 37.7, 37.8; 53/54, 53; 209/111.9, 82, 74, 73; 137/82, 83

[56] References Cited

UNITED STATES PATENTS 3,218,844  11/1965  Kleist et al............................73/37.6 X
3,468,416  9/1969   Hester..................................209/79 X
3,483,970  12/1969  McArthur............................73/37.6 X
3,485,357  12/1969  Payne......................................209/79

*Primary Examiner*—Allen N. Knowles
*Attorney*—William Anthony Drucker

[57] ABSTRACT

Apparatus adapted to react to the presence or absence of articles at a location in a feed path, for example tablets in a tablet-packaging machine, comprises a senser for sensing selectively the presence and absence of an article at the location, a responder adapted to respond to signals originated by the senser, and coupling means connecting the senser to the responder. The coupling means has repeatable first and second periods of operation separated in time, and is adapted to assume a state in which it can pass signals from the senser to the responder, said first and second periods being separated by mute periods during which the coupling means is incapable of passing a signal from the senser to the responder.

10 Claims, 10 Drawing Figures

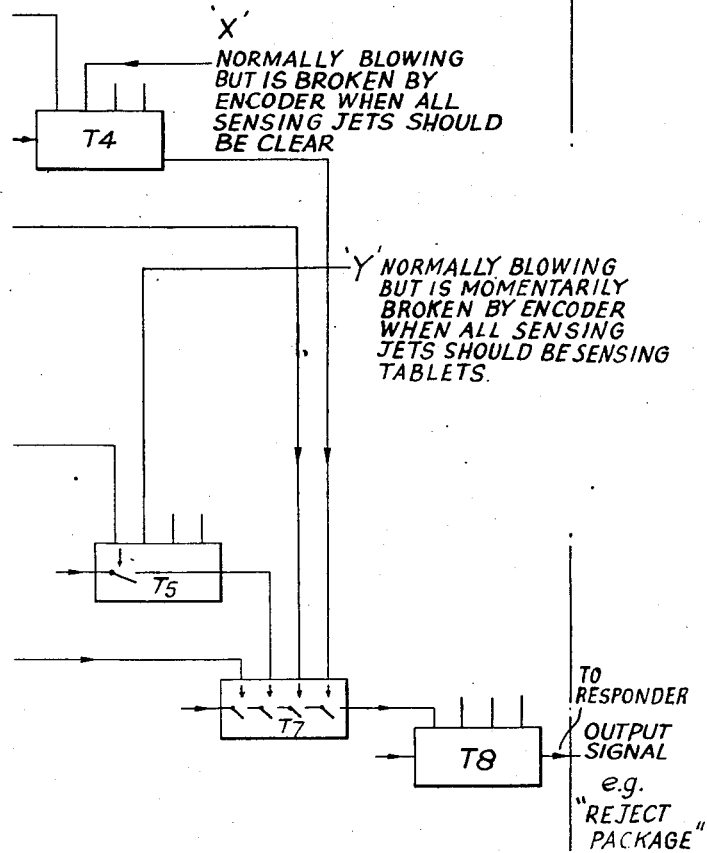

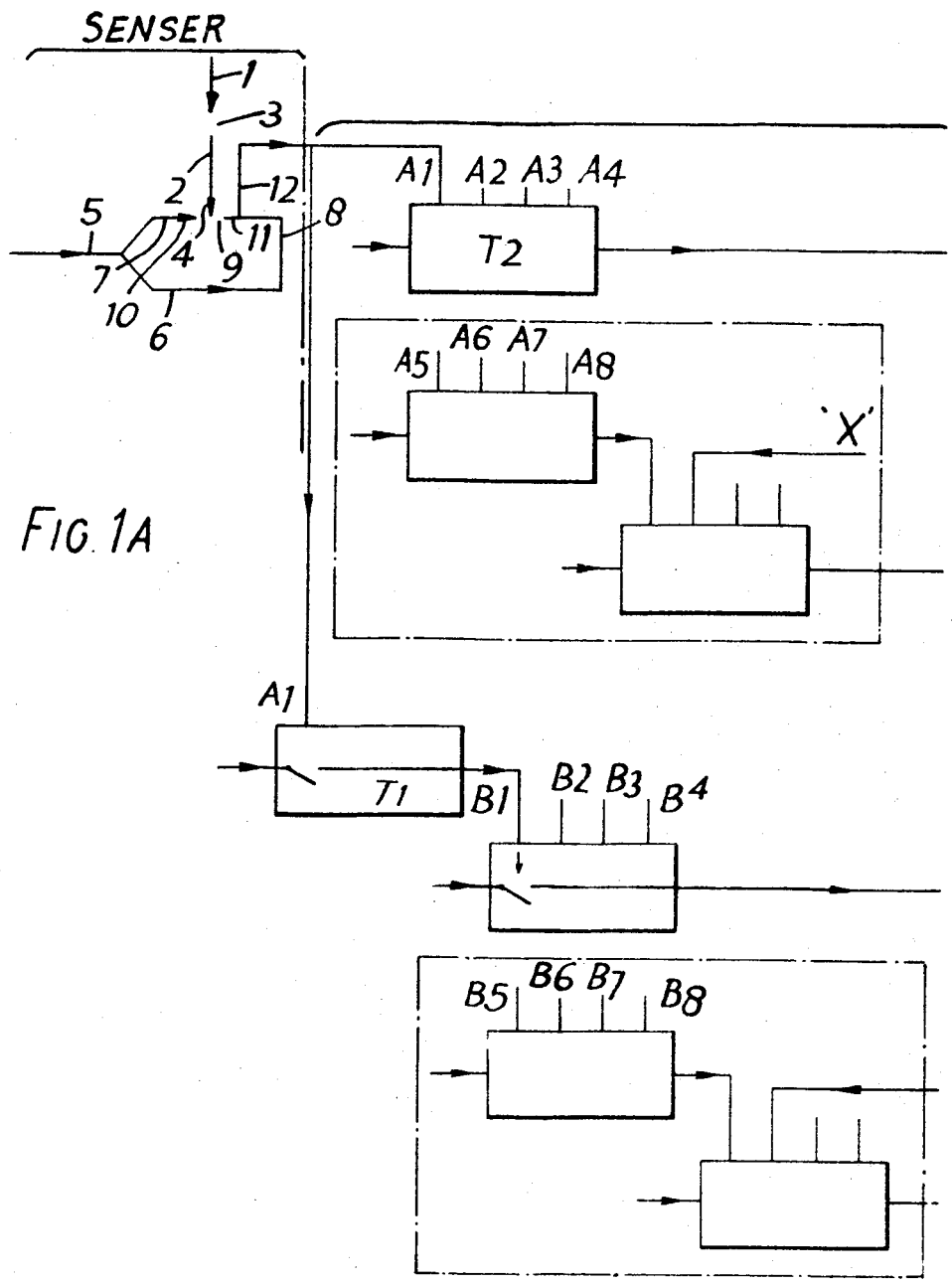

INVENTOR:
HAROLD T. FILE

2

ARTICLE SENSING APPARATUS

This invention relates to apparatus adapted to react to the presence or absence of articles at a location in a feed path.

In order to facilitate description of the apparatus, it is particularly described below in relation to packaging apparatus, but it is not restricted to such use and may, for example, be applied to the counting or checking of individual articles or batches of articles.

A known form of packaging for small articles such as tablets, and especially medicinal tablets, involves the placing of the article between two plies of packaging material which are then caused to adhere one to the other about the area occupied by the article so as to produce a sealed package.

In a known tablet packaging machine operating on this principle, the tablets are fed through delivery chutes to receiving positions at which they are temporarily halted prior to injection between two plies of packaging material. The two plies are thereafter sealed together, all about the spaced tablets, by means of crimping rollers which have pockets in their periphery to correspond to the positions occupied by the tablets, thereby avoiding crushing of the tablets during the crimping operation, but ensuring that each tablet lies within a pocket area surrounded by a fully crimped area of the eventual package. After crimping and sealing, the portion of the two-play strip containing the tablets is severed and passed to a delivery station.

In carrying out such packaging, it is extremely desirable to be able to ensure that the tablets do in fact arrive at their receiving positions, and are in good (i.e. whole) condition at that time. If one or more of the tablets is missing at the time of crimping, the sealing rollers will nevertheless still perform the sealing operation and leave an uncrimped pocket area corresponding to the position which the tablet would have occupied if it had been present, so that the eventual package, short of one or more tablets, is not readily distinguishable visually from a package containing the full number of tablets in good condition. There is no simple method of inspecting every package, and it will be appreciated that the weighing or mechanical probing of every individual package is not practical under production-run conditions.

In the present invention, apparatus adapted to react to the presence or absence of articles at a location in a feed path comprises a sensor for sensing the presence or absence of an article at the location, a responder adapted to respond to signals originated by said sensor, and coupling means connecting said sensor and said responder, said coupling means having repeatable first and second periods of operation separated in time, said coupling means being adapted to assume a state in which it can pass signals from the sensor to the responder, said first and second periods being separated by mute periods during which the coupling means is incapable of passing a signal from the sensor to the responder. In the packaging machine context referred to above, the sensor could comprise a relay in combination with an actuator. The relay includes jet means for forming a laminar flow, a receiver spaced therefrom and positioned to receive the laminar flow, means for providing a back-pressure signal to the receiver, e.g., from the jet means, and an output path from the receiver. The actuator comprises means defining an actuator flow path including a gap to receive the article to be sensed, and jet-forming means downstream of said gap and positioned to direct a flow transversely to and so as to intersect the laminar flow. With such an arrangement, if there is an article in the gap, there is no transverse flow and the laminar flow remains undeflected and passes to the receiver, and a resultant of the laminar flow and of the pack-pressure occurs in the output path. If there is no article in the gap, the actuator forms a jet which deflects the laminar flow so as not to be passed to the receiver, whereby the resultant in the output path is modified.

The apparatus may comprise means for periodically passing articles along the feed path, and an encoder and memory unit operable in synchronism with the article-passing means, said encoder adapted to supply sequential controlling signals to a coupling means for creating successive periods in which the coupling means is (a) rendered capable of passing an "article present" signal to the responder, (b) is muted, (c) is rendered capable of passing "obstruction absent" signal to the responder, and (d) is muted.

In the packaging context referred to, the articles could be tablets to be fed to packaging means, such as crimping rollers for packaging material, disposed in a feed path downstream of the sensing location. The relay outputs for the or each sensor, according to the number of tablets to be checked at each cycle, are conveyed to a circuit capable of causing initiation of a fault signal when (i) the or any sensor should be sensing the presence of a tablet at the location, but is not, and/or (ii) the or any sensor should be sensing the absence of a tablet or other obstruction at the location, but is not.

For function (i) above, there may be provided a cascade series of turbulence amplifiers, as described hereinbelow, one of which is normally retained in a non-variable condition by a gas flow supplied by a timer synchronized with the operation of the packaging machine. The gas flow is normally present and serves to mute the system. At an instant when the or each sensor should be sensing the presence of an article at the location, the timer stops the muting flow and permits the respective turbulence amplifier to become capable of change of state, depending upon the signal which it receives from the sensing means, i.e., "article present" or "obstruction absent" at the location.

For function (ii) above, there may likewise be provided a cascade series of turbulence amplifiers one of which is normally retained in a non-variable condition by a muting gas flow supplied by a timer. The gas flow is normally present and serves to mute the system. At an instant when the or each sensor should be sensing the absence of an article (or any other obstruction) at the location, the timer stops the muting flow and permits the respective turbulence amplifier to become capable of change of state dependent upon the signal received from the sensor.

A method of operating such apparatus may comprise the steps of:

i. sensing the presence at a required time of one or more articles at a location;
ii. feeding an "article present" signal to a coupling means such as a relay system;
iii. removing a muting signal to permit the coupling means to pass a sensing signal;
iv. causing the coupling means, in the absence of an "article present" signal, to actuate a responder such as a warning or rejecting means situated downstream of the location.

The method may further include the steps of:

i. sensing the absence at a required time of any obstruction at the sensing location;
ii. feeding an "obstruction absent" signal to the coupling means;
iii. removing a muting signal to permit the coupling means to become responsive to a sensing signal;
iv. causing the coupling means, in the absence of an "obstruction absent" signal, to actuate the responder situated downstream of the location.

Where more than one article is being included in a single cycle, the sensor relay outputs may be all connected to respective inputs of a "NOR" function amplifier. Where more than one group of sensors are included in the machine, the respective muted/non-muted outputs of the groups of sensors may all be connected to respective inputs of a "NOR" function amplifier. Where more than one section of a plurality of groups are included in the machine, the respective muted/non-muted outputs of the sections may all be connected to respective inputs of a "NOR" function amplifier. Where both the (i) and (ii) functions described above are included in the same machine, the signals derived from both systems may be connected to respective inputs of a "NOR" function amplifier in the common fault signal chain.

The apparatus, when used in the packaging context, may further comprise a package rejecting means disposed in the feed path downstream of the packaging means, and a memory device connected to the responder and to the package rejecting means, said memory device being adapted to actuate the package rejecting means to reject the package in respect of which the sensor has failed to give "article present" or "obstruction absent" signals during the appropriate periods, or has sensed any other irregularity.

The fault signal may be fed to the memory unit which, after a suitable time delay, causes operation of the package rejecting means. For example, where the packaging machine includes a knife serving to part off packages upon completion, the rejecting means may be a striker or a gate operating in synchronism with the knife and which continues to remove packages from the normal output path until such time as the fault signal ceases and the memory unit restores the rejecting means to its normal position.

In a preferred form, the sensor comprises means defining a temporary location for the article to be sensed, means for projecting a stream of fluid to be interrupted by an article present at said location, and means for detecting the interruption and non-interruption of said fluid stream.

The coupling means may advantageously be (i) a relay circuit comprising fluidic relays, or (ii) electric, or electromechanical or electronic relays.

In order to facilitate understanding of the nature of the present invention, an embodiment of tablet packaging machine incorporating the principles there of is hereinafter particularly described with reference to the accompanying drawings. In these drawings;

FIGS. 1a, 1b, together show a fluidics circuit diagram in which certain repetitive portions have been omitted for clarity and ease of reading;

Figure 1B:
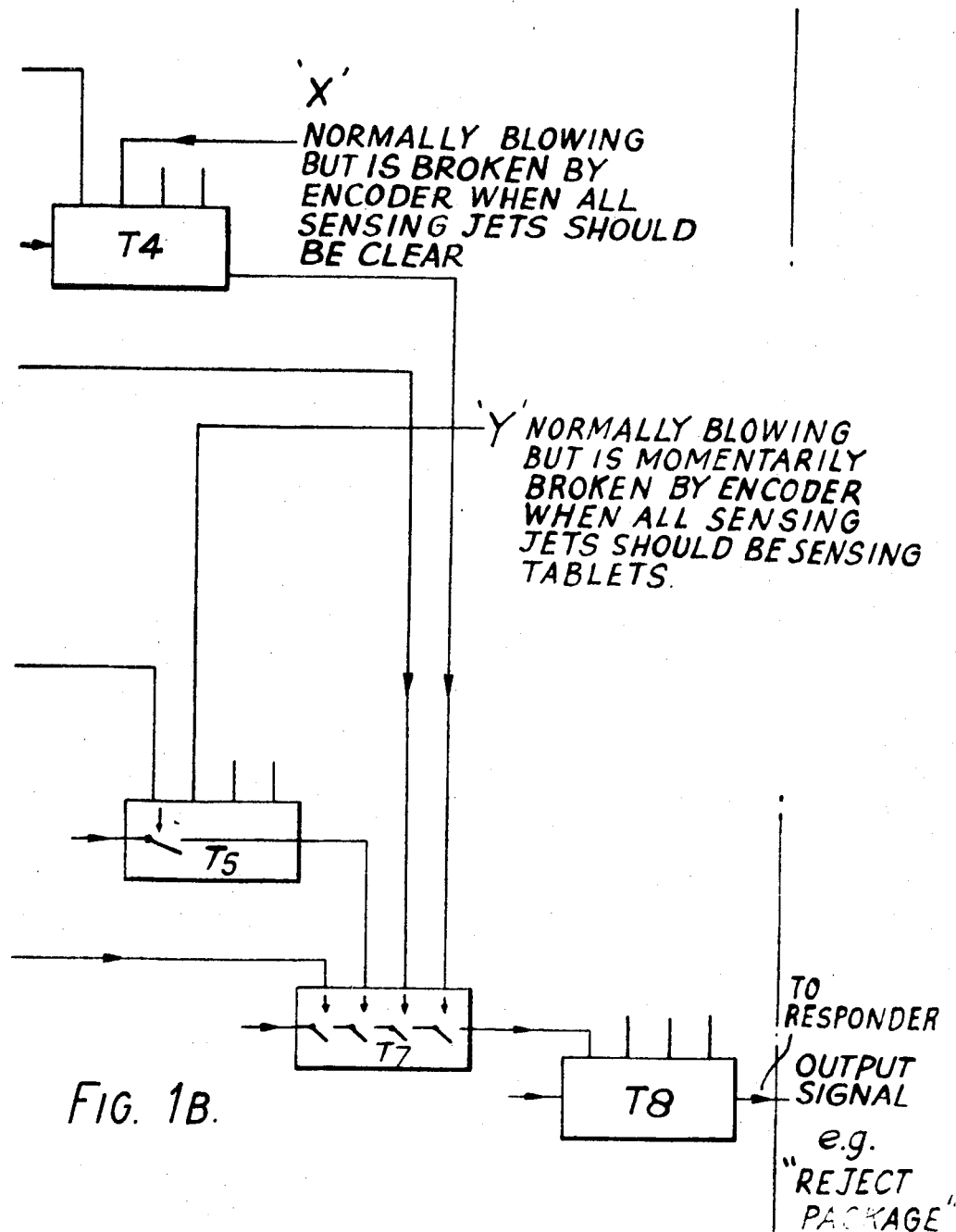

Referring to FIG. 1, the machine is provided at the receiving position for the tablets with a tablet-sensing device for each of the tablets. For convenience of terminology, the individual means for feeding each tablet of a multiple-tablet supply will be referred to as a channel, and multiple channels will be referred to as a group. A plurality of groups will be referred to as a section.

Each tablet sensor includes a jet-forming tube 1 and a jet-receiving tube 2 between which there is a gap 3 into which a tablet (not shown) passes in the receiving position. The jet-forming tube 1 is fed continuously with air under pressure and, so long as there is no tablet in the gap 3 between the two tubes 1 and 2, the air flow will be received by the receiving tube 2 and will cause a flow and a rise in pressure therein. When the tablet comes into receiving position, the air flow is interrupted and the air flow stops or is much reduced in the receiving tube 2.

Figure 3:
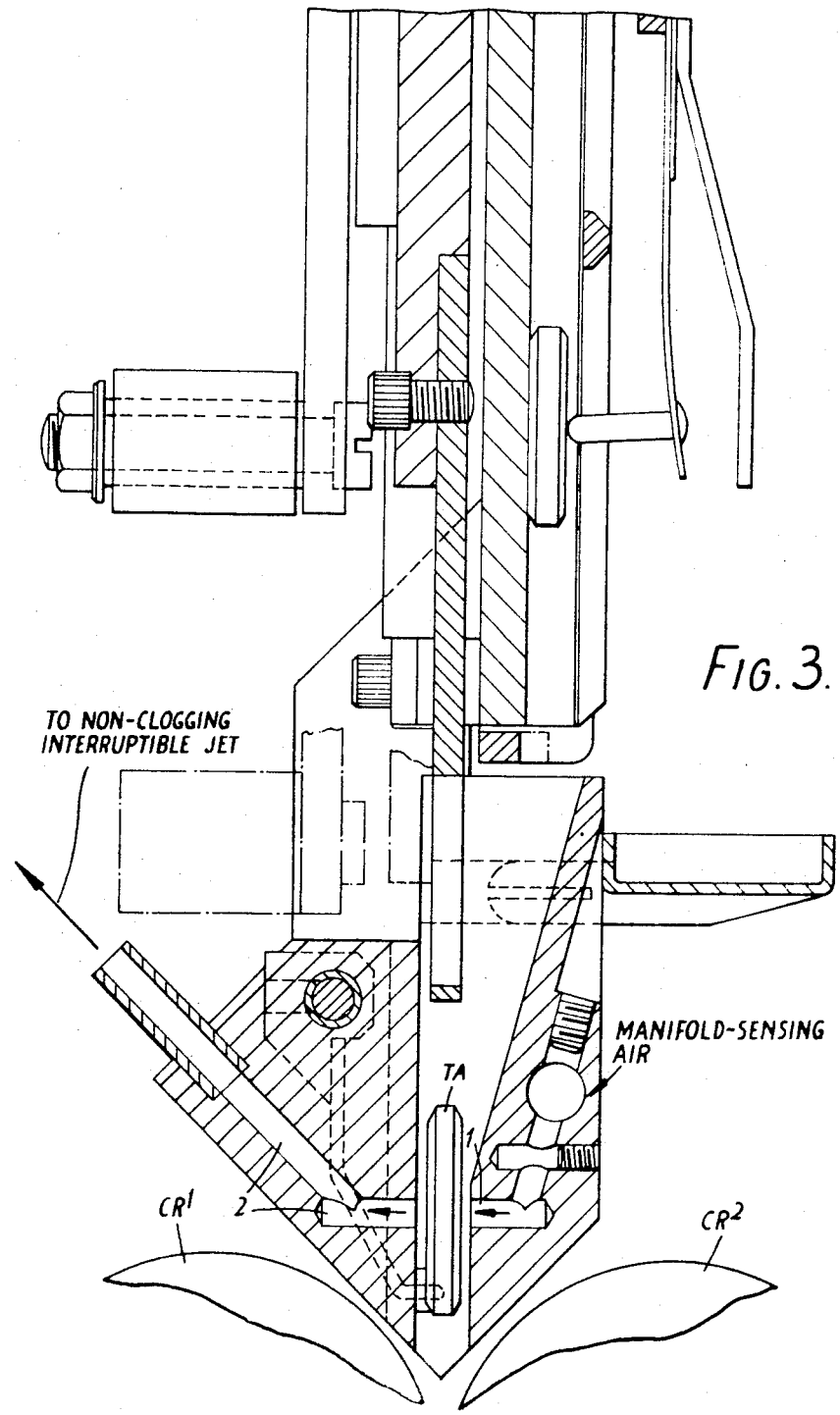
FIG. 3 is a vertical section of a portion of the packaging machine including a tablet-sensing location with means defining an actuator flow path.
Figure 4:
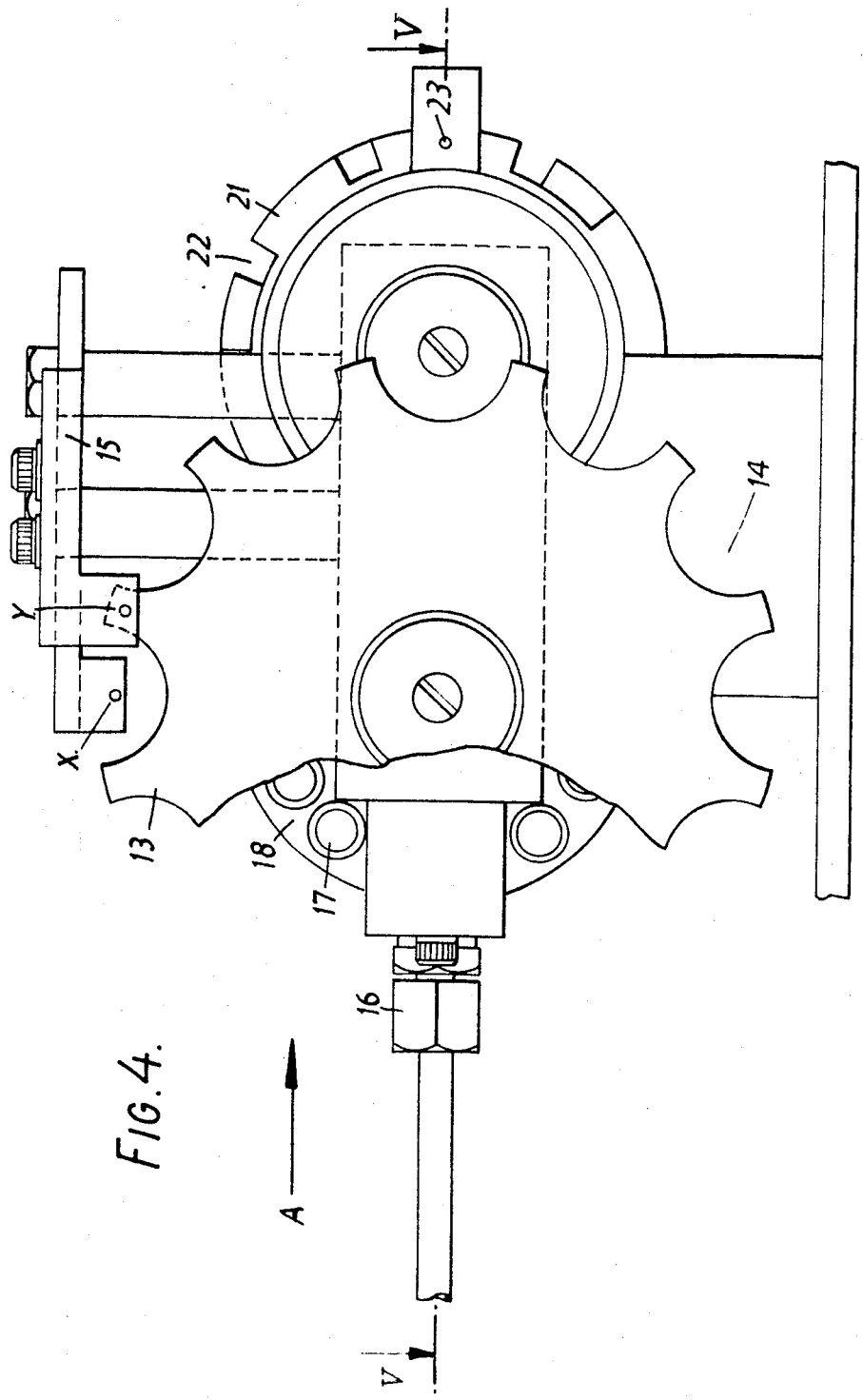
FIG. 4 is a side elevation of an encoding and memory unit used in conjunction with the fluidics circuits.
Figure 5:
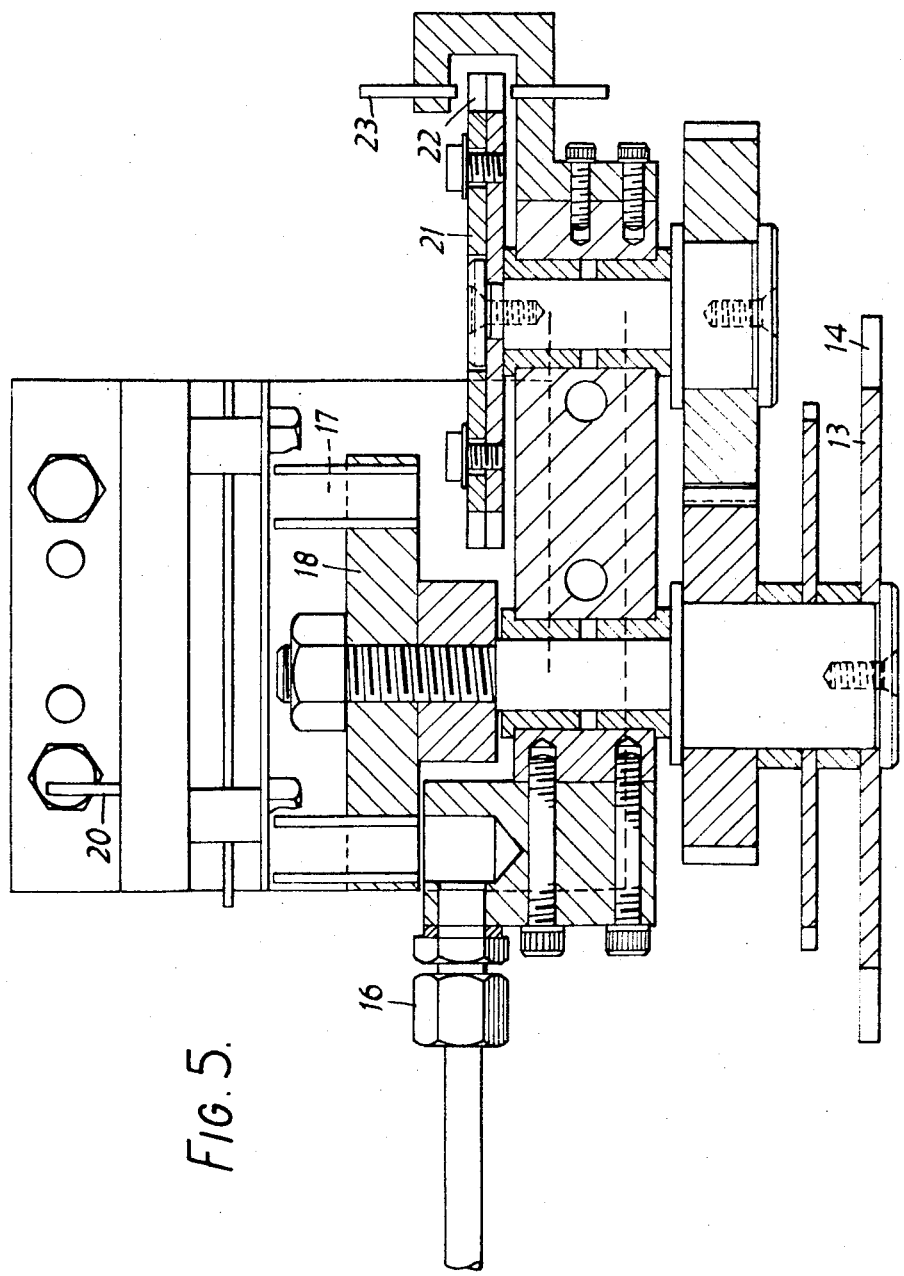
FIG. 5 is a section taken on the line V—V of FIG. 4.
Figure 6:
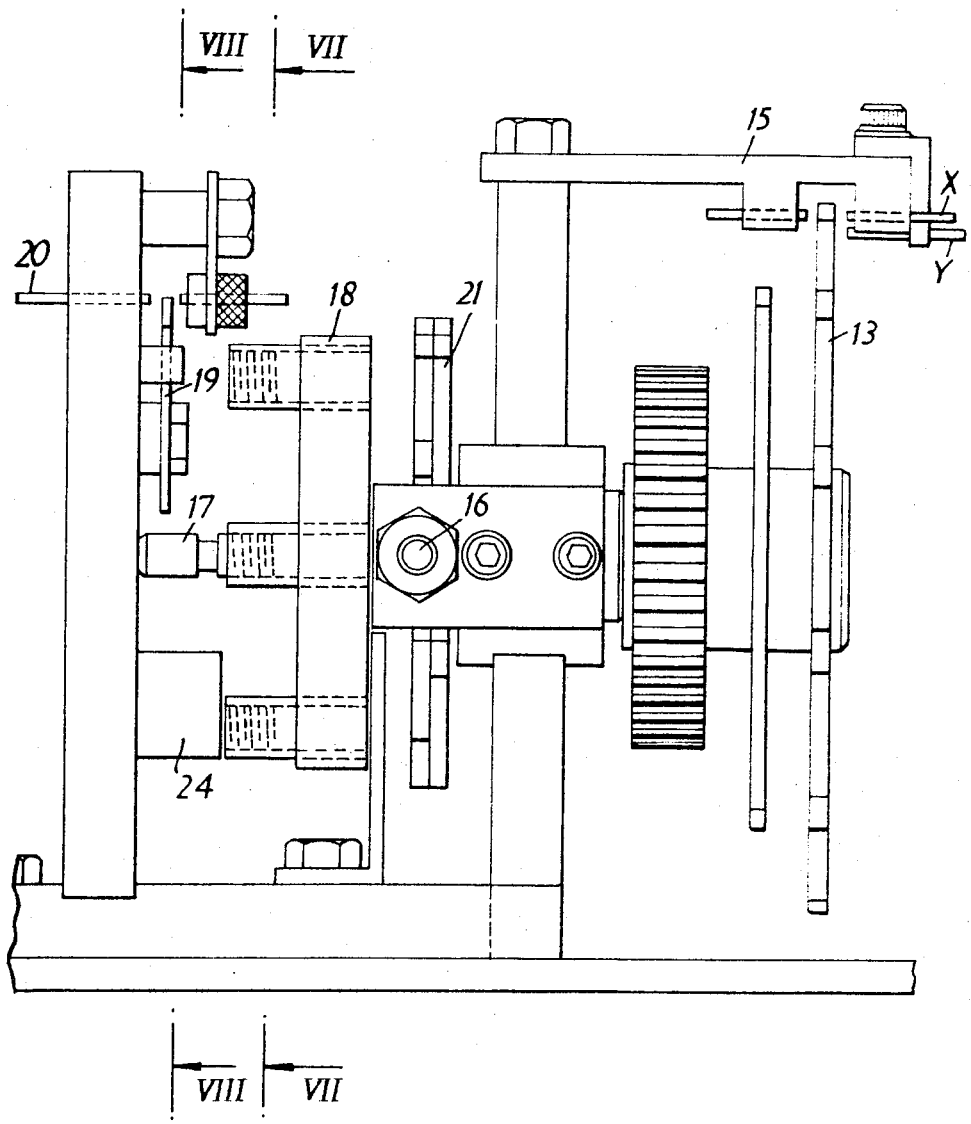
FIG. 6 is an end elevation viewed in the direction of the arrow "A" in FIG. 4.
Figure 8:
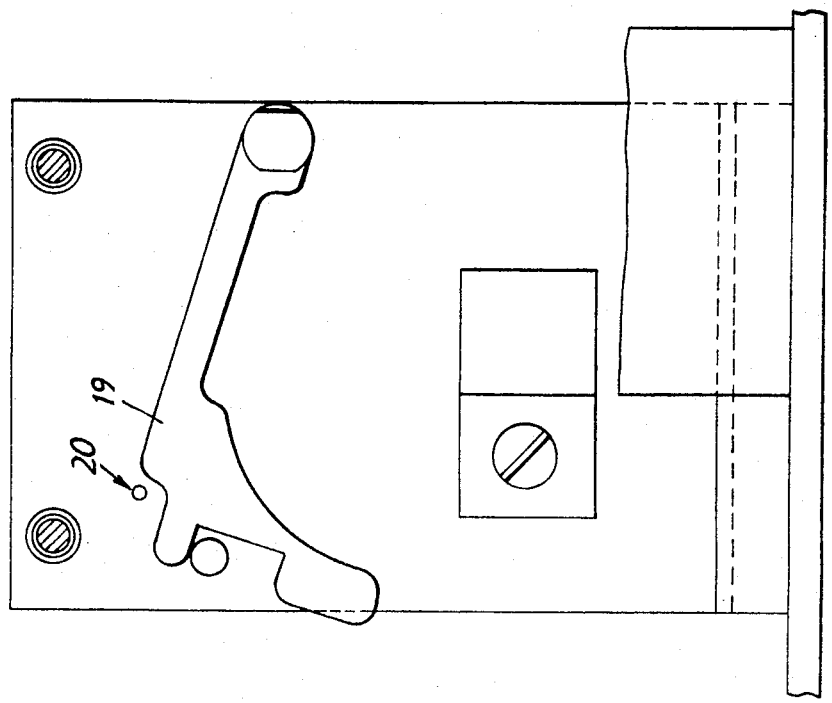
FIG. 8 is a vertical section taken on the line VIII—VIII of FIG. 6.
Figure 7:
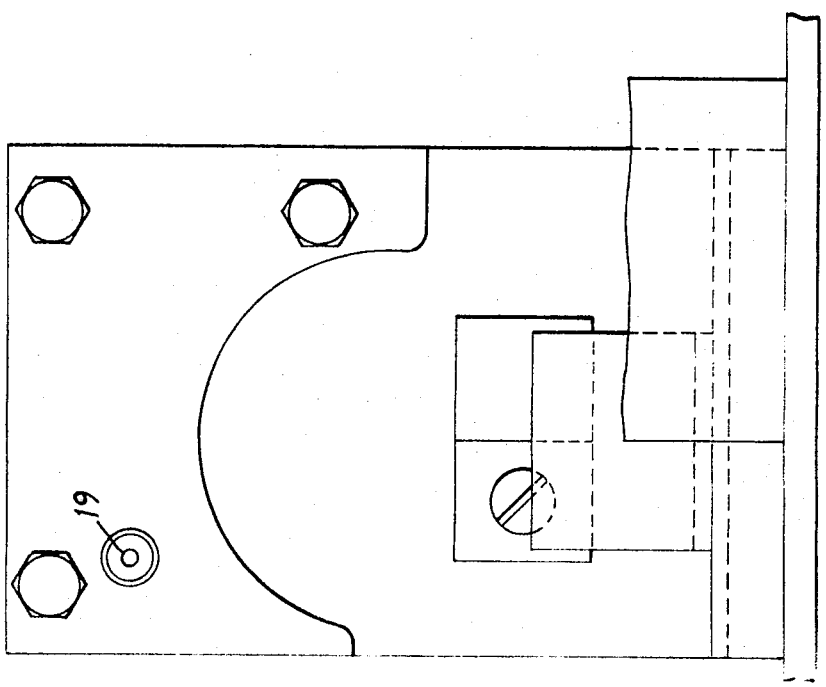
FIG. 7 is a vertical section taken on the line VII—VII of FIG. 6.

Referring to FIG. 3 of the drawings, a tablet "TA" is shown in the sensing location in which it is positioned between a jet-forming tube 1, receiving a flow of air from a manifold and a jet-receiving tube 2. The tablet "TA" is about to pass into the nip between pocketed crimping rollers $CR^1$ and $CR^2$ receiving between them two webs of packaging material.

Each receiving tube 2 communicates with an actuator jet nozzle 4 of a non-clogging interruptible jet device serving as a relay. The device has an air feed conduit 5 which divides into two branches 6 and 7 communicating at their remote ends at 8. One branch 7 is gapped at 9 and includes a jet 10 and a receiver 11 and in the same branch there is a take-off or "output" tube 12. Ignoring the actuator jet nozzle 4, in the normal condition of operation, the air supply flows along both branches 6 and 7, while bridging the gap 9 in the gapped branch 7, and sets up a proportionate pressure and flow in the output tube 12. The actuator jet 4 is positioned to emit an air flow normal to the air flow across the gap 9 Accordingly, any air stream flowing from the actuator jet 4 will interrupt the flow across the gap 9, and will result in a modification of the output flow in tube 12. So far as the relay device is concerned, flow in the actuator 4 entails a lowered back-pressure output signal in tube 12, and no-flow in the actuator 4 entails an increased back-pressure signal in tube 12.

The output of the relay device is communicated through tube 12 to an input of a turbulence amplifier $T_1$. A respective turbulence amplifier $T_1$ is provided for each sensing channel.

A turbulence amplifier is a fluid logic device which has a supply jet providing a laminar flow of gas to an output (receiver) tube, and an input jet is positioned to direct a stream of gas transversely to the laminar flow and cause it to become turbulent. When no input is applied there is an output "S" at the receiver tube, but when input is applied, there is effectively no output "S." More than one input can be incorporated, and in the example given there are four input jets any one of which, when operated, will turn off the output.

The output of each amplifier $T_1$ is passed to a respective input ($B_1$, $B_2$, $B_3$, etc.) of a turbulence amplifier $T_3$. The output of amplifier $T_3$ is passed to a respective input of a turbulence amplifier $T_5$, and a second input of the latter is connected to a source "Y" which is normally blowing.

The machine includes an encoder (see FIGS. 4 to 8) which is synchronized with the feeding, crimping and severing complexes. The encoder is arranged to interrupt the "Y" stream at the moment when all four of the sensors should be sensing the presence of a tablet in their respective gaps. If any sensor fails to sense a tablet, a fault signal is originated, as follows:

Assuming the presence of a tablet in the sensor gap 3, the sensor jet is broken, the relay actuator jet 4 is non-energized the relay output is "high" in tube 12, $T_1$ has no output, $T_3$ has output, and $T_5$ has no output. $T_5$ normally has no output, because "Y" is constantly blowing, but the momentary withdrawal of "Y" leaves $T_5$ capable of being affected by lack of an output from $T_3$. Thus, if there is no tablet in the gap 3, the sensor jet is unbroken, the relay actuator jet 4 is energized, the relay output is "low," $T_1$ has output, $T_3$ has no output, and $T_5$ achieves an output. This passes to a turbulence amplifier $T_7$ which then achieves "no output," and results in amplifier $T_8$ having an output which can be caused to originate a "fault signal" and to operate, for example, a "reject package" system.

The output of each relay device is also passed to a respective input of an amplifier $T_2$ having its output connected to an input of amplifier $T_4$, another input of which is connected to "X" which is normally blowing. "X" is controlled by the above-mentioned encoder and "X" momentarily ceases to blow when all the sensing jets at the gaps should be clear, leaving $T_4$ capable of having its state altered by a change of output of $T_2$. Thus, at a time when all the sensor gaps 3 should be clear, the relay actuator jets 4 are energized, the relay output is "low," and $T_2$ has output. Accordingly $T_4$ has no output, so that $T_7$ has output. If a whole tablet or a broken piece of tablet remains in and fouls one of the gaps 3, $T_2$ achieves no output, $T_4$ achieves output, and $T_7$ achieves no output, thereby resulting in output from $T_8$ causing a fault signal, such as "reject package." It will be appreciated that the same sequence of events will follow if a sensor jet should become inadvertently blocked.

Each channel (One tablet) requires one amplifier $T_1$ and in a combined tablet sensing and blockage sensing system, each group of one to four channels then requires four amplifiers $T_2$, $T_3$, $T_4$ and $T_5$. Each section of one to four groups requires amplifiers $T_6$, $T_7$ and $T_8$.

The fault signal (output from $T_8$) is fed to a memory unit which, after a suitable interval and in synchronism with the operation of the knife serving to cut off the completed package, operates also a package-rejecting device. As soon as normal conditions are restored, and no fault signals are being originated, the memory unit restores the package-rejecting device to a rest condition, again in synchronism with the knife operation.

Operation of the encoder or memory unit will now be described with reference to FIGS. 4 to 8. It includes a disc 13 having peripheral cut-outs 14 and driven in rotation so that each cut-out 14 coincides with the occurrence of a tablet pocket in the crimping rollers $CR^1$ and $CR^2$. On a supporting structure 15 there are provided jets "X" and "Y" as referred to above in relation to FIG. 1. As the disc 13 rotates, it interrupts the jets "X" and "Y" in the following sequence:

i. When neither "X" nor "Y" is interrupted, they are both "blowing," and this is an "accept" condition;

ii. When "Y" is interrupted, but "X" is blowing, then providing that all the required tablets TA are at the sensing location (see FIG. 3), the condition will be "accept." If one or more tablets were missing at the sensing location, the condition would be "reject;"

iii. When both "X" and "Y" are blowing, the condition is "accept";

iv. When "X" is interrupted, but "Y" is blowing, then provided that all channels are clear of any obstruction, the condition will be "accept." Any obstruction in one or more of the channels at the sensing location would cause a "reject" condition.

It will be seen that there is an "accept" condition (both "X" and "Y" blowing) to provide a transition between each condition of "tablet sensing" and "channels clear."

Figure 2:
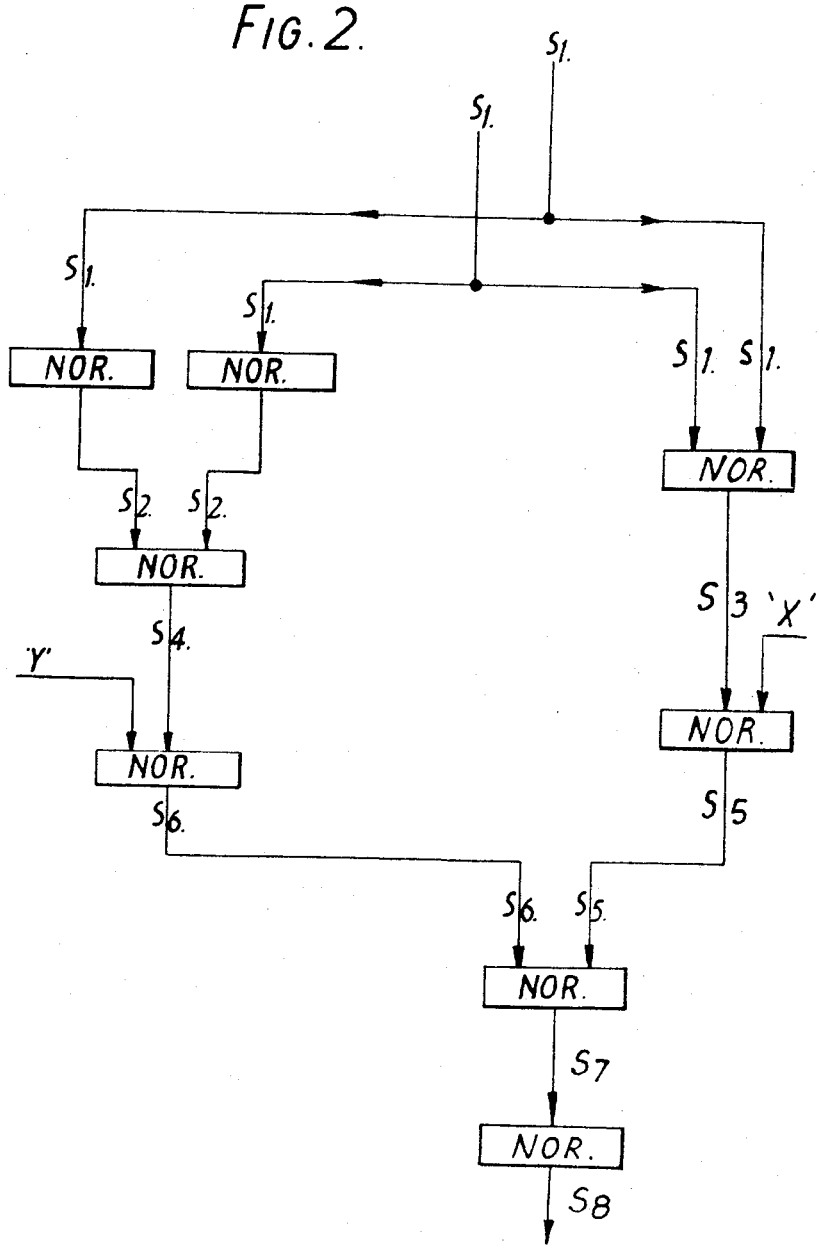
FIG. 2 is a logic diagram of a first sensing and reject-warning circuit of a two-channel packaging machine, as defined below.

When a "reject" condition is detected, according to the output $S_8$ in FIG. 2, a signal is transmitted to an air relay which passes high pressure air through a jet 16, causing the emergence axially of the plungers 17 carried by a wheel 18. The wheel 18 has a common drive with disc 13, and carries the same number of plungers 17 as there are cut-outs 14 on disc 13, and in the same relationship with the pocketing of the crimping rollers $CR^1$ and $CR^2$.

When a plunger 17 is moved outwardly by the applied air pressure, it contacts and lifts a blade 19 pivoted on the supporting structure, moving the blade 19 out of its rest position and into a position in which the blade interrupts a jet 20.

At each complete rotation of wheel 18, each plunger 17 contacts a stationary return-camming block 24 having an inclined surface which pushes the plunger back to its rest (inward) position.

A second timing disc 21 is driven and set in such a relative position of rotation that a cut-out 22 thereof will coincide with the action of a knife (not shown) serving to cut off the completed portion of the packaging strip. At the time when the jet 20 is interrupted, the next cut-out 22 on disc 21 coincides with an actuating signal jet 23, and causes a directing flap (not shown) to be operated, thereby directing the rejected package into a reject path. This directing of cut off packages into the reject path, by the directing flap, will continue until such time as the system has returned to the "accept" condition, at which time the plungers 17 will no longer be moved out axially so that when the last remaining moved-out plunger 17 has cleared the blade 19, the blade drops back into its rest position, whereafter the alignment of the next cut-out 22 with jet 23 will cause return of the directing flap to its normal (non-deflecting) position to permit the packages to be conveyed along the normal path.

The logic diagram is shown in FIG. 2, wherein $S_1$ and $S_1$ are "tablet present" signals receivable from sensors positioned to detect the presence or absence of two tablets of a package, and wherein $S_8$ is a "reject package" signal.

i. If there is no signal $S_1$, then with "X" blowing (and not "Y") there is no signal $S_7$, which results in generation of a signal $S_8$.

ii. If there is no signal $S_1$, then with "Y" blowing (and not "X") there is a signal $S_7$, and no signal $S_8$, i.e., an "accept" condition.

iii. If there is a signal $S_1$ and "X" is blowing (and not "Y"), there is a signal $S_7$, and no $S_8$.

iv. If there is a signal $S_1$ and "Y" (and not "X") is blowing, there is no signal $S_7$, and thus an $S_8$ signal is generated.

v. If both "X" and "Y" are blowing simultaneously, there is a signal $S_7$, and therefore there is no signal $S_8$.

The above states correspond to:

i. No tablet present, at a time when they should be present;
ii. No tablet present, at a time when none should be present;
iii. Tablet present, at a time when one should be present;
iv. Tablet or obstruction present, at a time when none should be present;
v. Transition period between "tablet sensing" and "channels clear."

Figure 9:
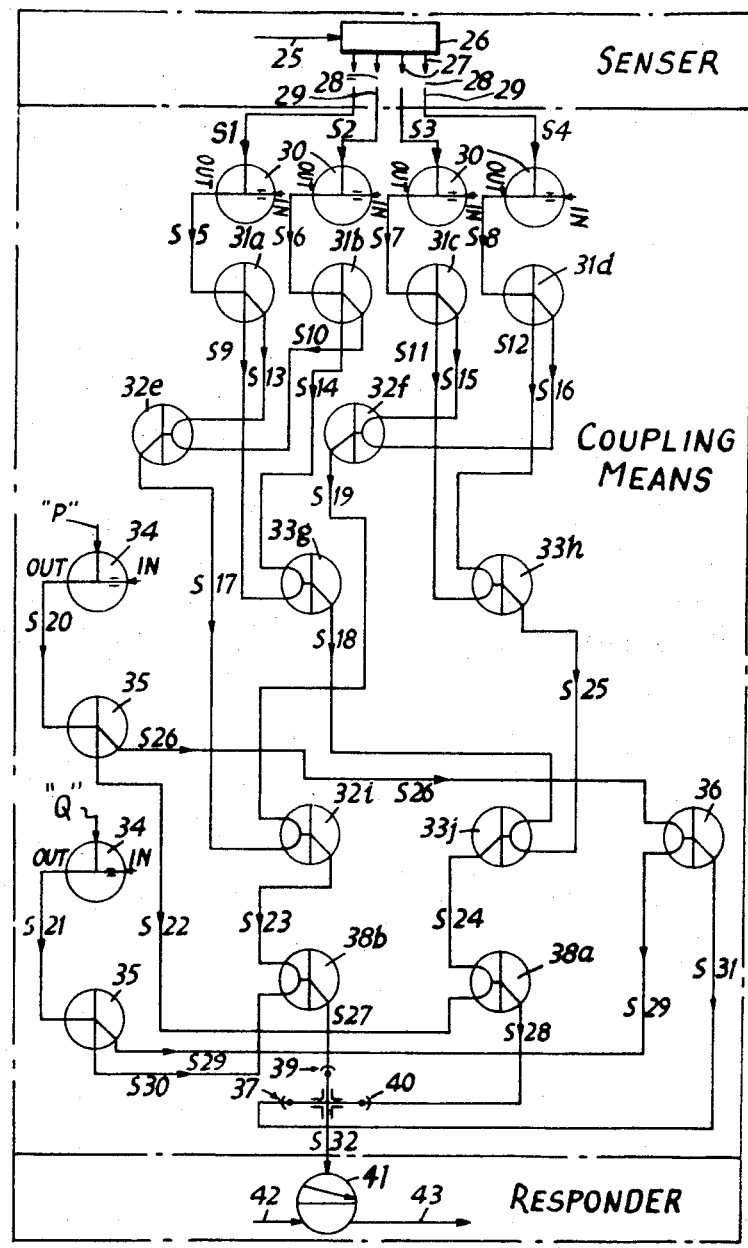
FIG. 9 is a diagram of a modified sensing and reject-warning circuit.

Referring to FIG. 9, which shows a modified sensing and reject-warning circuit for a machine which is otherwise similar to that described above, air is supplied at inlet 25, at 5–10 p.s.i. to a manifold 26 having four jets 27 leading to gaps 28 (see FIG. 3) in which tablets become positioned so as to be detected. Receiving conduits 29 lead to respective diaphragm amplifiers 30, the output signals of which are applied to respective "OR/NOR" logic elements 31a,b,c,d.

The presence of a tablet, or other obstruction, in any one of the gaps 28, results in elimination of the corresponding signal $S_1$, $S_2$, $S_3$, or $S_4$. These signals are amplified by the respective amplifiers 30 and result in respective signals $S_5$, $S_6$, $S_7$, and $S_8$. These signals are applied to the respective logic elements 31 and result in respective outputs, $S_{13}$, $S_{14}$, $S_{15}$, and $S_{16}$, whereas removal of said signals results in respective outputs $S_9$, $S_{10}$, $S_{11}$, and $S_{12}$.

Through the "AND" elements 32c, 32f and 32i, the signals $S_{13}$, $S_{14}$, $S_{15}$, and $S_{16}$ are added to give output signal $S_{23}$, and the absence of any one of them results in the absence of signal $S_{23}$.

Similarly, signals $S_9$, $S_{10}$, $S_{11}$, and $S_{12}$ are added by respective "AND" elements 33g, 33h and 33j to give an output signal $S_{24}$, whereas the absence of any one of those signals results in the absence of signal $S_{24}$.

The jets denoted by references "P" and "Q" are derived from encoder, (see FIGS. 4–8 and the corresponding description) and correspond respectively to the jets "X" and "Y" described in relation to the first embodiment, but because different logic elements are used, their effect is reversed.

When both jets "P" and "Q" are blowing, the signals after amplification in respective diaphragm amplifiers 34 result in respective signals $S_{20}$ and $S_{21}$ which are applied to "OR/NOR" elements 35 giving output signals $S_{26}$ and $S_{29}$ which are both applied to the same "AND" element 36 resulting in an output signal $S_{31}$ which is passed via a non-return valve 37 to give a signal $S_{32}$ ("accept" condition).

If jet "P" is interrupted, signal $S_{26}$ will cease, and so will signal $S_{31}$, but a signal $S_{22}$ will arise, and if the detection jets 27 are all blocked a signal $S_{24}$ will be present and will become combined with signal $S_{22}$ to give an output signal $S_{28}$ from the "AND" element 38a. Similarly, if the jet "Q" is interrupted, signal $S_{29}$ will cease, and so will signal $S_{31}$, but a signal $S_{30}$ will arise and if the detection jets 27 are all clear, a signal $S_{23}$ will be present and will become combined with signal $S_{30}$ to give an output signal $S_{27}$ from the "AND" element 38b. The output signals $S_{27}$ and $S_{28}$, passing via respective non-return valves 39 and 40, give output signals $S_{32}$ ("accept" condition).

Thus, the presence of tablets at gaps 28 when they are timed to be present is monitored by interrupting jet "P," whereas detection of clear gaps 28, when they are timed to be, is monitored by interrupting jet "Q."

"Accept" signal $S_{32}$ passes to a relay 41 which receives a supply of air, through inlet 42, at 45 p.s.i. The outlet 43 leads to an air-operable piston and cylinder device (not shown) arranged to operate a warning device and/or a device for rejecting a faulty package, for example in accordance with the description given earlier herein commencing with the origination of high pressure air through jet 16 (FIG. 4) as a result of a "reject" signal $S_8$ (FIG. 2) occurring.

I claim:

1. Apparatus adapted to react to the presence and absence of articles at a location in a feed path comprising a sensor for sensing selectively the presence and absence of an article at the location, a responder adapted to respond to signals originated by said sensor and coupling means connecting said sensor and said responder, said coupling means having repeatable first and second periods of operation separated in time, said coupling means being adapted to assume a state in which it can pass signals from the sensor to the responder, said first and second periods being separated by mute periods during which the coupling means is incapable of passing a signal from the sensor to the responder.

2. Apparatus, as claimed in claim 1, having packaging means disposed in the feed path downstream of the sensing location.

3. Apparatus, as claimed in claim 2, having a package rejecting means disposed in the feed path downstream of the packaging means, and a memory device connected to the responder and to the package rejecting means, said memory device being adapted to actuate the package rejecting means to reject a package in respect of which the sensor has failed to give selectively an "article present" signal and and "obstruction absent" signal during the appropriate periods.

4. Apparatus, as claimed in claim 1, having means for periodically passing articles along the feed path, and an encoder and memory unit operable in synchronism with the article-passing means, said encoder being adapted to supply sequential controlling signals to the coupling means for creating periods in which the coupling means is (a) rendered capable of passing an "article present" signal to the responder, (b) is muted, (c) is rendered capable of passing an "obstruction absent" signal to the responder, (d) is muted.

5. Apparatus, as claimed in claim 4, having packaging means disposed in the feed path downstream of the sensing location.

6. Apparatus, as claimed in claim 5, having a package rejecting means disposed in the feed path downstream of the packaging means, and a memory device connected to the responder and to the package rejecting means, said memory device being adapted to actuate the package rejecting means to reject a package in respect of which the sensor has failed to give selectively an "article present" signal and an "obstruction absent" signal during the appropriate periods.

7. Apparatus, as claimed in claim 1, wherein the sensor comprises means defining a temporary location for an article to be sensed, means for projecting a stream of fluid to be interrupted by an article present at said location, and means for detecting the interruption and non-interruption of said fluid stream.

8. Apparatus, as claimed in claim 1, wherein the coupling means is a circuit comprising a number of fluidic elements.

9. Apparatus, as claimed in claim 1 wherein the coupling means is a circuit comprising electronic devices.

10. Apparatus, as claimed in claim 1, wherein the coupling means is a circuit comprising electro-mechanical devices.

* * * * *